United States Patent [19]
de la Fuente Burton

[11] 3,844,590
[45] Oct. 29, 1974

[54] INTEGRAL CLAMP FOR HYDRAULIC CONNECTIONS

[75] Inventor: Jorge de la Fuente Burton, Mexico, Mexico

[73] Assignee: Plastotecnica, S.A., Naucalpan de Juarez, Mexico

[22] Filed: June 25, 1973

[21] Appl. No.: 372,811

Related U.S. Application Data

[63] Continuation of Ser. No. 175,089, Aug. 26, 1971, abandoned.

[52] U.S. Cl................................. 285/197, 285/423
[51] Int. Cl............................................. F16l 5/00
[58] Field of Search .......... 285/197, 198, 199, 423; 138/99

[56] References Cited
UNITED STATES PATENTS

| 3,132,881 | 5/1964 | Corey | 285/197 |
| 3,606,398 | 9/1971 | Bucceda | 285/197 |

FOREIGN PATENTS OR APPLICATIONS

| 1,020,750 | 11/1952 | France | 285/197 |

Primary Examiner—Dave W. Arola
Attorney, Agent, or Firm—Waters, Roditi, Schwartz & Nissen

[57] ABSTRACT

An integral clamp for hydraulic connections, for use in household service and the like, consisting in a hoop which clamps the main piping and to which main piping it is attached by means of fastening devices, wherein the above mentioned hoop includes a normally projected tubular-shaped element which is diametrically split all the way down to the hoop that is also split and in which element interior a coupling sleeve is housed in a fixed position with said sleeve having a curved inferior end that includes a peripherical groove on which a ring-shaped seal of elastomeric material is superposed, which seal is hermetically pressed against the external surface of the main piping by the action of a binding nut, that is, threadedly coupled to the external surface of the projection element, and which binding nut which is ring-shaped is superposed on the above mentioned coupling sleeve and leans on a peripherical protruberance of the coupling sleeve.

4 Claims, 5 Drawing Figures

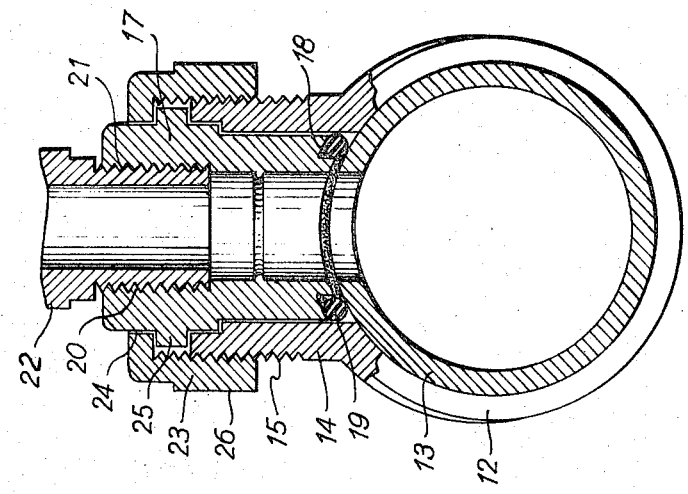
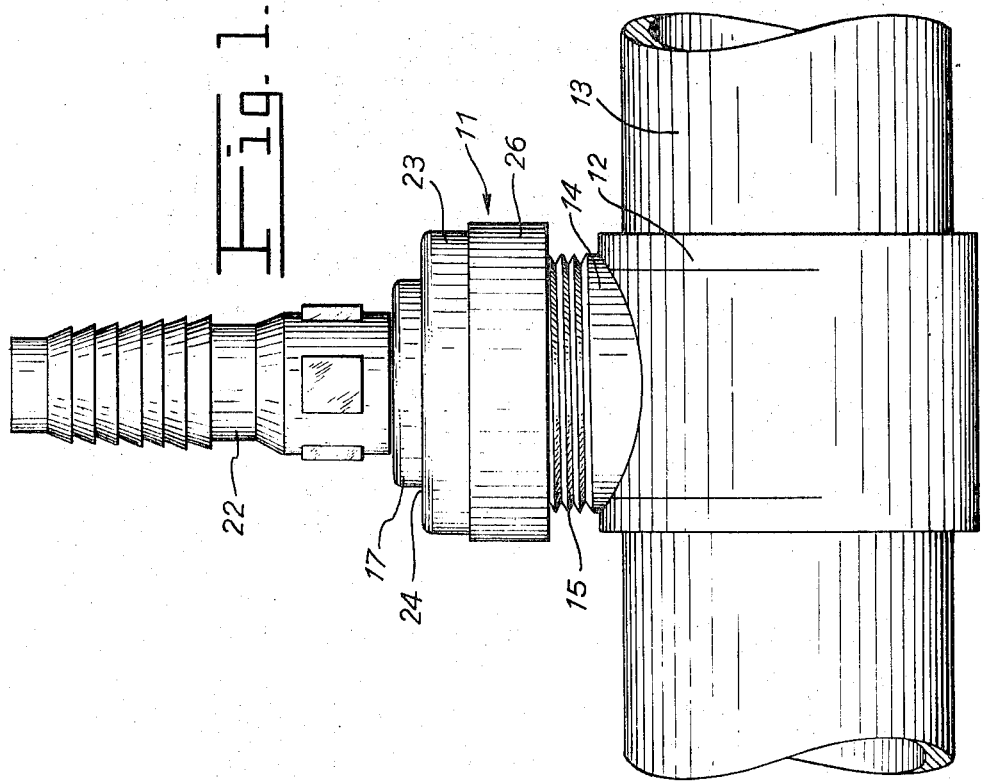

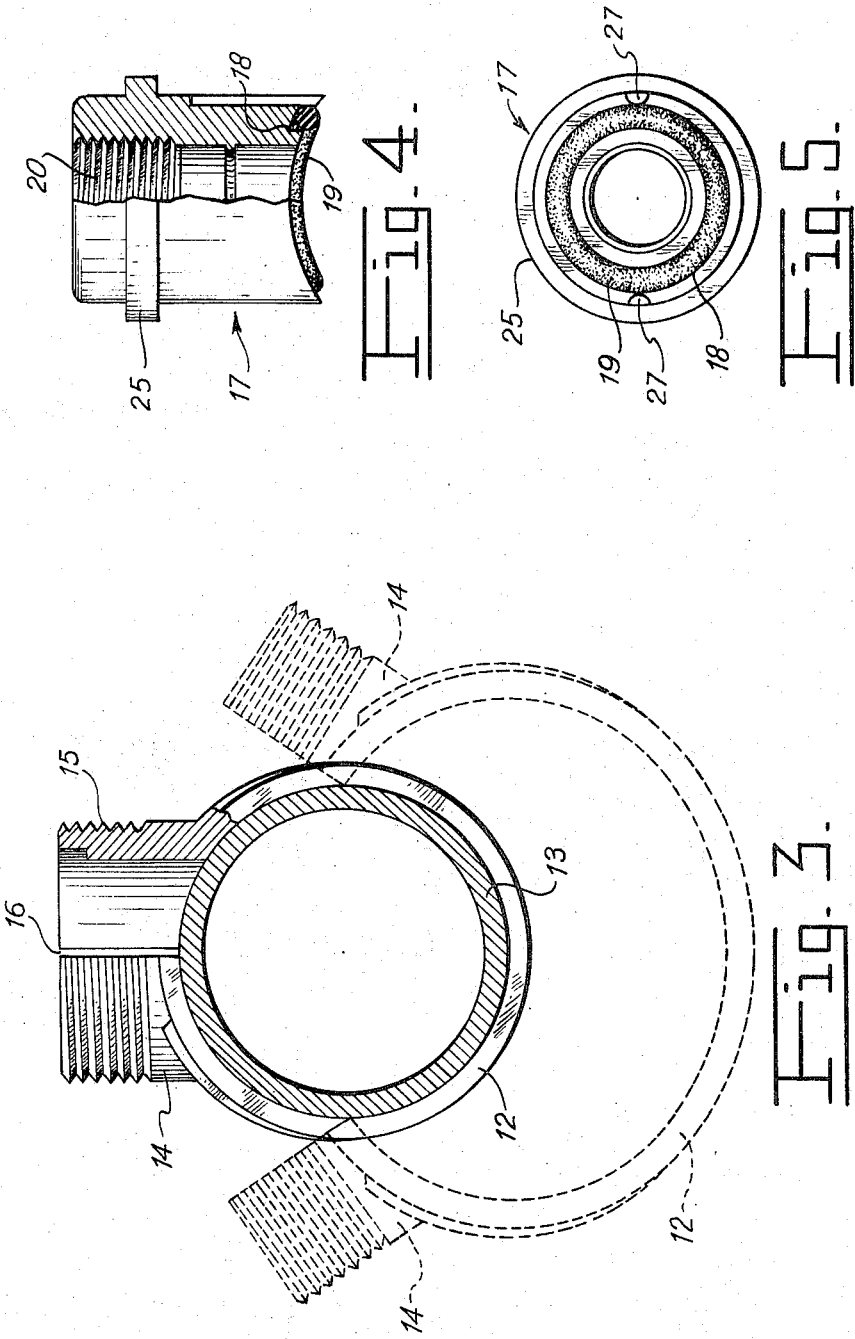

INTEGRAL CLAMP FOR HYDRAULIC CONNECTIONS

This application is a continuation application of Ser. No. 175,089, filed Aug. 26, 1971, now abandoned.

BACKGROUND OF THE INVENTION

To date, clamps are integrated by multiple members, which make difficult the installation of same and at the same time requiring skilled personnel to avoid errors in their installation.

On the other hand, installation of this kind of conventional clamps requires fastening devices such as screws with their corresponding nuts, wedges or other elements difficult to handle.

Furthermore, the type of clamps currently in use for hydraulic connections, require the use of auxiliary tools for their installation, and the adjustment obtained is unsatisfactory.

At the same time, with the type of clamps currently in use, undesirable stresses are exerted upon the clamps as well as on the piping on which they are installed, all of which results in more time-consuming and requires additional labor.

BRIEF SUMMARY OF THE INVENTION

It is therefore an object of this invention to provide a clamp for hydraulic connections such as household service, consisting of a reduced number of elements, said clamp does not require the use of additional tools for their installation, and rendering a perfect adjustment to the piping.

The clamp of this invention does not require for its installation the use of screws, wedges or any other fastening means of difficult handling, thus reducing considerably installation time.

On the other hand, the adjusting system of the clamp of this invention avoids excessive stresses and strains, both in the piping as well as in the clamp being installed. Due to the simple elements of the clamp it is not possible to incur in errors of installation.

These and other objects to be obtained in the application of this invention shall be better understood and appreciated from reading the following description which refers to the attached drawings of the preferred embodiment of same.

DETAILED DESCRIPTION OF THE DRAWINGS

FIG. 1, is an elevated vertical view of the clamp for hydraulic connections, such as those used for household services installed on the piping.

FIG. 2, is a conventional longitudinal sectional view of the clamp illustrated in FIG. 1.

FIG. 3, is a front elevated view of the hoop or ring of the clamp of this invention, mounted on the piping, illustrating with dotted lines the manner on which it is installed.

FIG. 4, is an elevated detailed sectional vertical view illustrating a coupling sleeve which is partially inserted in a projected tubular-shaped member of the hoop illustrated in FIG. 3.

FIG. 5, is an inferior plan view of the coupled sleeve illustrated in FIG. 4.

DETAILED DESCRIPTION OF THE INVENTION

Clamp 11 of the present invention for hydraulic connections, such as those used for household service, is structured by a hoop 12 which is mounted on a main piping 13; said hoop 12 includes a radial tubular projection member 14 which is perpendicular to its longitudinal axis, including in its external surface a threading 15; said tubular member 14 includes a diametrical split 16, which extends longitudinally up to the hoop 12 and allowing the mounting operation thereof on the piping 13. Due to the flexibility of the material from which the hoop is made the opening of same is permitted as well as the restoring of it to its original closed position, as illustrated in FIG. 3. A coupling sleeve 17 is located in the interior of the tubular member 14, in a fixed position by means of a guide member shown as a matter of example in the form of small bosses. The sleeve 17 is inserted in member 14 in a fixed position by way of said guide bosses 17, located in the internal surface of said member 14. Said guide member is located in the internal surface of the tubular member 14; said sleeve 17 has its inferior end curved and including there on an external annular groove 18, on which an elastomeric material ring seal 19 is superposed. An internal threading 20 is included at the opposite end of said sleeve, to which a threaded end 21 of a nozzle connecting or adapting nozzle 22 is coupled for an hydraulic connection, such as those used for household service pipes.

To integrate the clamp assembly and hermetically adjusting the sealing element 19 on the external surface of the piping 13, a ring-shaped binding nut 23, constituting a fastening device for the hoop 12, is coupled to the external threading 15 of the tubular-shaped member 14; said nut 23 when being screwed on rests a top flange 24 which is projected forwardly on a ring-shaped peripherical protuberance 25 of the coupling sleeve 17, until an hermetic contact of the sealing element 19 is obtained on the external surface of the piping 13.

For installation of the above mentioned clamp, as it is illustrated in FIG. 3, the hoop 12 is opened, and thereafter it is mounted on the main piping 13, then the tubular member 14 is oriented towards the desired location, the coupled sleeve 17 is further inserted in the interior housing of the tubular member 14, the coupling sleeve is located in a fixed position by means of the guide member 27 formed in the interior face of said tubular member 14, which sleeve 17 already includes in its lower end the superposed elastomeric material ring seal 19; the coupling sleeve 17 being then adjusted by screwing the binding nut 23 until an hermetic contact of the sealing element 19 to the external surface of the piping 13 is attained, and later by using an adequate tool, pipe 13 is drilled serving the coupling sleeve 17 as a guide to the mentioned tool, and, finally, the coupling sleeve 17 above mentioned is coupled to the nozzle of connection 22 for coupling the household service or hydraulic connections desired. This latter connection may be effected through the use of any other fitting element.

The above mentioned binding nut 23 may include external grooves 26 to permit easy handling of same.

Although the invention has been shown and described particularly referring to the preferred embodiment of same, those skilled in the art will understand that the aforementioned and other changes in form and detail can be made without departing from the spirit and scope of the invention.

I claim:

1. An integral clamp for hydraulic connections for use in household service and the like, comprising in combination:
   a. clamp means including a hoop portion having a substantially constant diameter and extending for substantially 360° adapted to substantially completely encompass and clamp a main tubular member integrally formed with said hoop portion and normally projecting therefrom, said tubular member and said hoop portion being diametrically split along the axial length thereof so as to form a resiliently deformable split-ring structure and axially extending guide means being formed on the internal annular surface of said tubular member;
   b. a tubular coupling sleeve forming a connection with a household piping being fixedly positioned within said tubular member; said coupling sleeve having an axially inner end surface arcuately shaped so as to be coextensive with the inner circumferential surface of said hoop portion; guide means formed on the exterior annular surface of said coupling sleeve cooperatively engaging the guide means on said tubular member so as to position said coupling sleeve in a predetermined angular relationship within said tubular member; and annular groove means in the arcuate inner end of said coupling sleeve;
   c. ring-shaped seal means positioned in said annular groove means and projecting therefrom radially inwardly of said hoop portion;
   d. and a ring-shaped binding nut being threadedly engaged on a complementary thread on the external annular surface of said tubular member and adapted to exert a compressive force to said tubular member and said hoop portion so as to clamp the latter about the main piping, said tubular member and coupling sleeve having diameters smaller than the diameter of said hoop portion.

2. A clamp as claimed in claim 1, comprising an internal thread being formed at the upper end of said coupling sleeve adapted to be engaged by a complementary threaded end of a household service piping.

3. A clamp as claimed in claim 1, comprising an adapter adapted to be fastened to the upper end portion of said coupling sleeve for connecting the latter to a household service piping.

4. A clamp as claimed in claim 1, said binding nut being annular and including an upper flange and peripheral grooves.

* * * * *